United States Patent
Beach et al.

[11] Patent Number: 5,892,827
[45] Date of Patent: Apr. 6, 1999

[54] METHOD AND APPARATUS FOR GENERATING PERSONAL IDENTIFICATION NUMBERS FOR USE IN CONSUMER TRANSACTIONS

[75] Inventors: Kirk W. Beach, Bellevue, Wash.; George E. Mercer, Oldsmar, Fla.

[73] Assignee: Catalina Marketing International, Inc., St. Petersburg, Fla.

[21] Appl. No.: 663,680

[22] Filed: Jun. 14, 1996

[51] Int. Cl.⁶ .................................................. H04L 9/00
[52] U.S. Cl. .................... 380/24; 380/51; 705/14; 705/1; 340/825.34
[58] Field of Search ................ 395/214; 380/24, 380/51; 340/825.34; 705/14, 1

[56] References Cited

U.S. PATENT DOCUMENTS

| | | | |
|---|---|---|---|
| 4,757,537 | 7/1988 | Edelmann et al. | 380/51 |
| 4,775,246 | 10/1988 | Edelmann et al. | 380/23 |
| 4,864,618 | 9/1989 | Wright et al. | 380/51 |
| 4,934,846 | 6/1990 | Gilham | 380/51 X |
| 5,128,752 | 7/1992 | Von Kohorn | 395/210 |
| 5,305,383 | 4/1994 | Guillou et al. | 380/24 |
| 5,353,218 | 10/1994 | De Lapa et al. | 395/214 |
| 5,390,251 | 2/1995 | Pastor et al. | 380/21 |
| 5,502,636 | 3/1996 | Clarke | 395/214 |
| 5,557,721 | 9/1996 | Fite et al. | 395/214 |
| 5,665,023 | 9/1997 | Cordery et al. | 380/51 |

*Primary Examiner*—Thomas H. Tarcza
*Assistant Examiner*—Pinchus M. Laufer
*Attorney, Agent, or Firm*—Noel F. Heal; John J. Halak

[57] ABSTRACT

A system for generating authorization codes, such as personal identification numbers, at the point of distribution of certificates of value on which the authorization codes are to be printed or otherwise encoded. Because the authorization codes are generated in real time, there is no need to store and safeguard an inventory of preprinted certificates, or even an inventory of activated authorization codes. The principles of the invention apply both to systems for generating incentive award certificates and to systems for generating purchased certificates of value. The incentive awards or certificates of value are tokens of prepayment for a service, such as long-distance telephone service or other service. The authorization codes generated for inclusion with the value certificates are unique and seemingly random. They are generated by taking a non-random unique code, such as a sequence code, and encrypting it to obtain seemingly random, but unique, authorization codes. Because each authorization code is not generated until immediately prior to distribution of the certificate with which the code is associated, security and other problems pertaining to preprinted certificates and cards are eliminated.

15 Claims, 4 Drawing Sheets

METHOD AND APPARATUS FOR GENERATING PERSONAL IDENTIFICATION NUMBERS FOR USE IN CONSUMER TRANSACTIONS

BACKGROUND OF THE INVENTION

This invention relates generally to systems for issuing consumer promotions, usually in the form of coupons or certificates, in response to the purchase of preselected items in a retail store, or simply when a customer purchases one of the promotions. More specifically, the invention relates to systems for issuing promotions or certificates of the type that requires a unique personal identification number (PIN) to be conveyed to a customer receiving the item. PINs are printed or encoded on valuable certificates awarded to customers and subject to redemption for various promotional and marketing purposes. Each certificate must be resistant to fraud and must be secure from duplication. Therefore, each certificate's PIN number must be unique and, in general must be generated randomly. Having random but valid unique numbers requires the creation and storage of the numbers in databases. The administration of such a database becomes very time consuming, expensive and difficult. Therefore, there is a need for a PIN generation technique that eliminates the requirement for creating and maintaining a valid PIN database.

More specifically, the present invention relates to the awarding of property, goods, services, or rights, at the point-of-sale, based on certain criteria which can be measured at the point-of-sale, and where the authenticity of the award can be verified at the time of redemption with the use of a code that need not be established prior to the award. While the invention will be described mainly in connection with the awarding of free long distance telephone service, it is to be understood that the principles of the invention are also applicable to providing any award, at the point-of-sale, where the subsequent verification of the award can be accomplished without the need for a pre-established list of valid authorization codes.

A marketing technique that has enjoyed increasing popularity is the awarding, at the point-of-sale, of a free product or service as an incentive to purchase other products or services. Typical marketing programs offer 5 or 10 minutes of long distance service as incentives to purchasing the sponsoring company's product, as potential prizes for participating in a marketing contest, or as premiums offered under a retailer's frequent shopper loyalty program, or simply as a product for purchase. With respect to marketing long distance telephone service, there are generally two methods employed. One method entails the registration of the consumer and the issuance of a telephone "credit card" for which an account is established and is later credited with certain dollar amounts of telephone service based on the consumer's actions or purchases. Another method is to issue telephone "debit cards" to each consumer meeting the requirements of the particular marketing program. These debit cards are generally pre-authorized in 5 or 10 minute denominations. The issuance of a debit card does not establish an account, but rather is authorized for the specified amount of telephone service and then becomes useless after the telephone time is exhausted. With both methods, the consumer is usually required to dial a toll-free number and provide a personal identification number (PIN) in order to activate the free service. This PIN must be randomly generated prior to the issuance of the telephone credit/debit card so that verification of valid usage can be established prior to granting the free service.

With each of the processes described above, there is a requirement that a physical card (similar to a consumer credit card) be issued to the consumer. The manufacture and delivery of these cards represents a significant expense and therefore can be cost prohibitive in many circumstances. In addition, there are security concerns inherent in the manufacture and delivery of the cards since someone other than the intended user could easily convert them for their own use (especially in the case of the debit card since the PIN is generally pre-printed on the card itself). Another limitation of the current methods of marketing telephone cards is the fact that the account and/or a PIN must be generated prior to the issuance of a card. This can result in a time lag from the time the consumer complies with the offer and the time at which the telephone service is available (especially with respect to the credit card method). This limitation can also cause shortages or excess inventories of cards based on consumer demand (especially with respect to the debit card method).

Regardless of whether a certificate or award is presented to a consumer as an incentive to purchase selected products or simply in response to a request to purchase the service that the certificate provides, the difficulties described above have inhibited safe and efficient distribution of such certificates. The following paragraphs discuss the problems that apply specifically to the distribution of prepaid service certificates, such as prepaid long-distance calling cards.

Problems first arise at the manufacturing stage. Cards are typically preprinted with the value in dollars or the time in minutes, in preset amounts, even though the consumer may prefer to have a different value or time. Moreover, preprinted cards have the further limitation that they contain fixed important information, such as an "800" toll-free number for accessing the service. Access numbers may become overloaded and cause inconvenient delays for the user and new access numbers may have to be added to meet demand, but there is no convenient way to update this information on a pre-printed card. Similarly, each preprinted card has a PIN (personal identification number) that must be used to activate the card, i.e., turn it on for use. The preprinting of PINs on the card exposes the value of the card to anonymous and usually untraceable theft. Once the card is printed, its value can be stolen without physically taking the card itself. The theft can take place anywhere from the printing source to the retail outlet. It will be apparent that sending these "live" cards through a supply and distribution process is fraught with security risks. The special handling adds to the cost and difficulty of marketing and selling remote value cards. Unsuspecting consumers may purchase cards that are either depleted or being used by others purchased illegally. The merchandising and sales of tamper resistant cards adds to the cost and effort for everyone. Live cards with protected PINs must be treated as a near-cash item through the distribution and retailing process. As a delivery of cards is made to a store, if it is not kept under lock and key or in the cash drawer it may be easily stolen, lost or misplaced. The cards themselves are very small and easily concealed by unscrupulous employees or shoppers. Therefore, suppliers and retailers of these cards are exposed to a very large financial risk in handling the cards. If the value is taken illegally from a card, it is not possible for the retailer to accept the return or bill back the supplier.

One solution is to distribute "dead" cards instead of "live" ones. A dead card is one that has a PIN that must be activated by the retailer before distribution to the consumer. Activating preset PINs is very expensive, time consuming and error prone. Distributing dead cards with PINs that require activation is, therefore, inconvenient and is still prone to theft and misuse because some card suppliers preprint and assign the PINs in a uniform, predictable or unprotected manner. Dishonest persons may dial the access number and enter PINs until they successfully access the service, or may look for a pattern in multiple PINs, and then resell the PIN and access numbers to different users. Another potential problem is that some PIN sequences are purposely short, for the convenience of the user. This creates a dangerous situation, since a computer dialer can more easily pick and decipher short PINs that are not encoded.

Another proposed solution to the security problem is to use scratch-off coatings and removable tape covers over the PINs. This has a limited effect because the "live" and valuable cards can still be stolen and used anonymously by dishonest persons, anywhere through the supply chain.

Systems have been proposed in which prepaid cards are sold without a PIN. The PIN is activated or attached to the card after is a call is made to a central computer that issues PINs. In some systems of this type PINs may be downloaded in a batch, and then held until a card is purchased, at which time a PIN is attached to the preprinted portion of the card. The principal limitation of this method is that a call must be made to a central computer to issue a PIN. This slows the down the transaction and, in a retail environment, slows down the cashier while the computer is dialed and the PIN is issued. Further, a dishonest or inattentive cashier could sell or give away the value of the PINs.

Some prepaid telephone cards are sold or vended in enclosed plastic containers placed in a store display rack. The cashier selling such cards typically scans a bar code on the display itself, and a PIN is obtained by placing a call to the service provider. This bar-coded activation method fails to prevent fraud or misuse by others as the bar codes can be duplicated and used on more than one card. A thief could steal one or more cards and purchase one to obtain the valid batch code, thus activating the stolen cards as well.

It will be appreciated from the foregoing that prior art techniques for distributing certificates or cards redeemable for a valuable service all have practical difficulties that render the certificates or cards both inconvenient to the consumer and vulnerable to fraud or theft. There is a need for a new approach for distributing such certificates or cards in a convenient manner without compromising the security of the valuable services that are obtained by use of the cards. The present invention satisfies this need, as briefly described in the following summary of the invention.

SUMMARY OF THE INVENTION

The present invention resides in a method for assuring security of individually identifiable randomly numbered certificates is accomplished by printing an encoded self-validating PIN on each certificate. An encryption method permits the PIN to be deciphered when it is presented for redemption. The method enables a greater number of potential personal identification numbers, in the form of PINs, to be generated from a limited or fixed number of digits.

The method includes the printing of an authorization code on the certificate, which code will subsequently be used to verify the validity of the award. Preferably, the method includes the generation, in real time at the point-of-sale in a retail store, of seemingly random authorization codes which will be subsequently used to verify the validity of the award as well as to provide information pertaining to the location of the printing of the authorization code on the certificate, which will also be subsequently used to verify the validity of the award.

Briefly, and in general terms, the method of the invention comprises the steps of detecting the occurrence of an event that has been preselected to trigger the generation of a certificate of value for distribution to a customer of a retail store; generating a certificate of value in response to the detecting step; generating a unique and seemingly random authorization code at about the same time that the certificate is generated; and including the authorization code in the certificate. The certificate is self-validating and has no existence or value prior to its generation and there is, therefore, no requirement to keep an inventory of either certificates or authorization codes before their generation.

More specifically, the step of generating a unique and seemingly random authorization code includes forming a unique code and encrypting it to obtain the unique and seemingly random authorization code. The step of forming a unique code includes combining a unique sequence number with other codes, and the step of encrypting includes combining the unique code with a key code, and positionally rearranging the code obtained from the combining step, to obtain the unique and seemingly random authorization code. The method may also include the step of validating the authorization code when the certificate is presented to claim its value, wherein the validating step includes decrypting the authorization code to recover the unique code, and then verifying that the unique code is valid.

The step of detecting an event may be either detecting the purchase of at least one triggering product, in which case the certificate is in the nature of a reward for purchasing the triggering product, or detecting a request to purchase a selected value certificate, in which case the certificate is itself a purchased triggering product.

In terms of novel apparatus, the invention comprises an in-store computer to detect the occurrence of an event that has been preselected to trigger the generation of a certificate of value for distribution to a customer of a retail store; a certificate generator for generating a certificate in response to the detection of a triggering event; and an authorization code generator, for generating a unique and seemingly random authorization code at about the same time that the certificate is generated; wherein the authorization code is included in the generated certificate, which becomes self-validating on generation. Because the authorization codes are generated at the time of certificate distribution, there is no requirement to keep an inventory of either certificates or authorization codes. More specifically, the authorization code generator of the apparatus includes encryption logic, for encrypting a unique code to obtain the unique and seemingly random authorization code. The encryption logic includes a code combiner, for combining the unique code with a key code to obtain a first-level encrypted code; and code sequence rearrangement logic, for changing the sequence of digits in the first-level encrypted code, to obtain the seemingly random authorization code. The apparatus may also include validation logic, for decrypting the authorization code to recover the unique code, and then verifying that the unique code is valid. As in the method discussed above, the apparatus may be used in two alternative ways. Specifically, the certificate generator either operates in response to the purchase of a preselected triggering product, and generates a reward certificate, or operates in response to a request to purchase a value certificate.

Accordingly, besides the objects and advantages of the encryption and self-validating PIN system described, several objects and advantages of the present invention are:

(a) to provide an economical system and method for delivering "value" to consumers, in the form of a promotion certificate that is uniquely identifiable by a randomly numbered code, such that the certificate is self validating and self liquidating, meaning that the certificate itself contains sufficient information to enable the consumer to have the certificate validated and to receive "value" for the certificate in some designated form;

(b) to provide a system and method for generating randomly numbered certificates that are fraud resistant, without the need for a pre-approved database of valid PINs;

(c) to provide a unique PIN to be inserted onto a certificate by printing; and (d) to provide a system and method that eliminates the need for a special pre-printed card for receiving prepaid services.

Other aspects and advantages of the invention will become apparent from the following more detailed description, taken in conjunction with the accompanying drawings, which are briefly described below.

DESCRIPTION OF THE PREFERRED EMBODIMENTS

Figure 1:
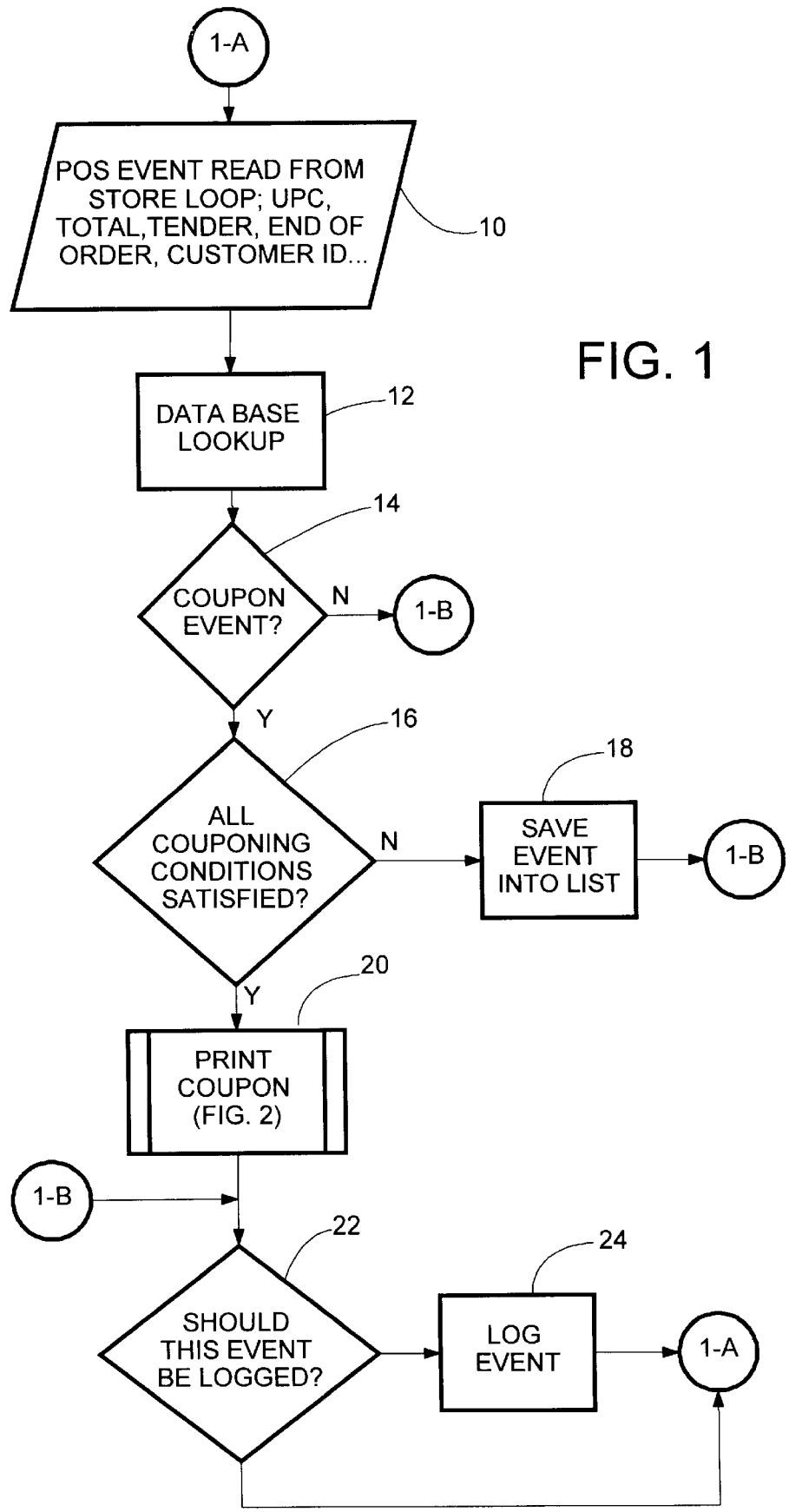
FIG. 1 shows a flowchart of the process of identifying conditions for printing a certificate and or coupon.

As shown in the drawings for purposes of illustration, the present invention relates generally to the awarding of property, goods, services, or rights, at the point-of-sale, based on certain criteria which can be measured at the point-of-sale, and where the authenticity of the award can be verified at the time of redemption with the use of a code that need not be established prior to the award. While the invention is described mainly in connection with the awarding of free long distance telephone service, it is to be understood that the principles of the invention are also applicable to providing any award, at the point-of-sale, where the subsequent verification of the award can be accomplished without the need for a pre-established list of valid authorization codes. The same principles of the invention also apply to the generation of certificates purchased at the point of sale by consumers, wherein the certificates are part of a mechanism for providing a valuable service to the consumers. The most significant difference between a certificate purchased by a consumer and one generated as a reward, is the source of payment for the certificate. When it is purchased by the consumer, the consumer pays for the value of the certificate; when it is distributed as a reward, some other entity, such as a product manufacturer or retailer, pays for the value of the certificate. The mechanism for generating the certificate, and in particular the PIN printed on the certificate, is the same in both cases.

In the context of a reward, the invention offers an alternative to "cents off" coupons and free product items. Instead, the invention gives customers free minutes of long distance phone time or other valuable services. More specifically, the invention entails the monitoring of data that is transmitted over the point-of-sale computer network or "store loop," as indicated in block 10. This data encompasses any event that can be identified from the point-of-sale system, including but not limited to, the method of payment, the total price of shopping order, the historical purchase behavior of a particular customer, or the Universal Product Codes or other standard code of items purchased. These items of data are analyzed to determine if any of them relate to an award program currently being promoted. If the data detected on the point-of-sale system is a triggering item for a program in the program database 12, then the invention will commence an awarding process. If not, the coupon or certificate generation steps are bypassed, as determined in decision block 14. In decision block 16, the system determines whether all prescribed conditions have been met. A coupon or certificate may be defied to be generated only upon the occurrence of multiple conditions, such as the purchase of multiple products. If not all of the conditions have been met, the detected event is saved in a list, as indicated in block 18, and coupon or certificate generation is bypassed.

Figure 2:
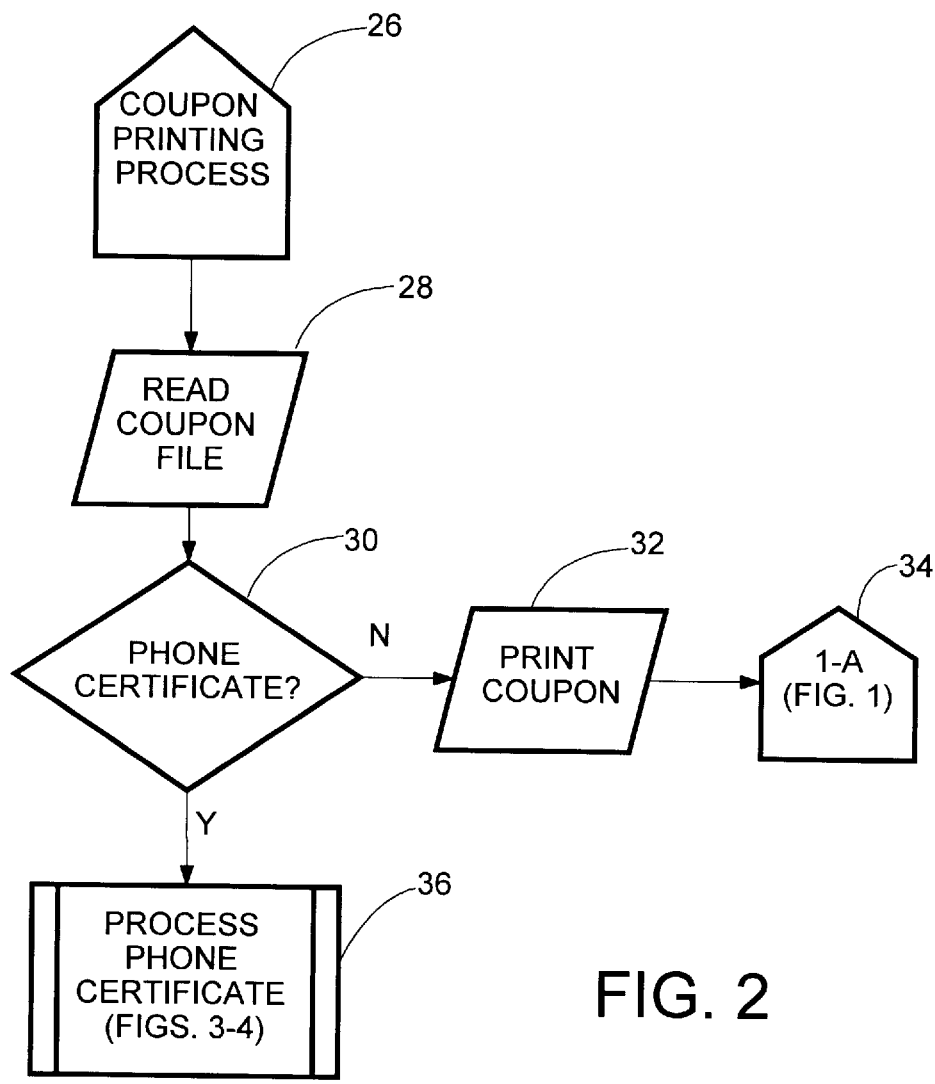
FIG. 2 shows a flowchart of the process of coupon and or phone certificate.

If it is determined that coupon or certificate printing should take place, this function is performed, as indicated in block 20 and further described in FIG. 2. The processing loop of FIG. 1 is continued by checking whether the detected event should be logged, as indicated in block 22, and if so, logging the event as indicated in block 24.

The coupon printing process begins as indicated at 26 in FIG. 2 and includes reading a coupon file, as indicated at 28 to determine the nature of the coupon or certificate to be printed. If the coupon is not a telephone service certificate, as determined in clock 30, a conventional discount coupon is involved and is printed (block 32) before returning, as indicated at 34, to the processing loop of FIG. 1. If a telephone service certificate is involved, as determined in block 30, processing continues in block 36, as further detailed in FIG. 3.

If the award to be given requires an authorization code to be printed on the certificate, then the system will determine if the award program is to be run with pre-established authorization codes or with system generated codes. Using pre-established authorization codes is the conventional method for generating certificates with authorization codes, and is not shown in the drawings. Pre-established authorization codes are generated by the party that will be providing the awards and are loaded into a database as they become available. If the award program requires the use of pre-established codes and an unused, pre-established code exists, the system will print a certificate, which describes the nature of the award and provide an authorization code, to be used in redeeming the award. If, upon searching the database for unused codes, the system determines there are none, the system will print a message at the point-of-sale to indicate that the award is not currently available and indicate some other means for obtaining the award that was earned.

Figure 3:
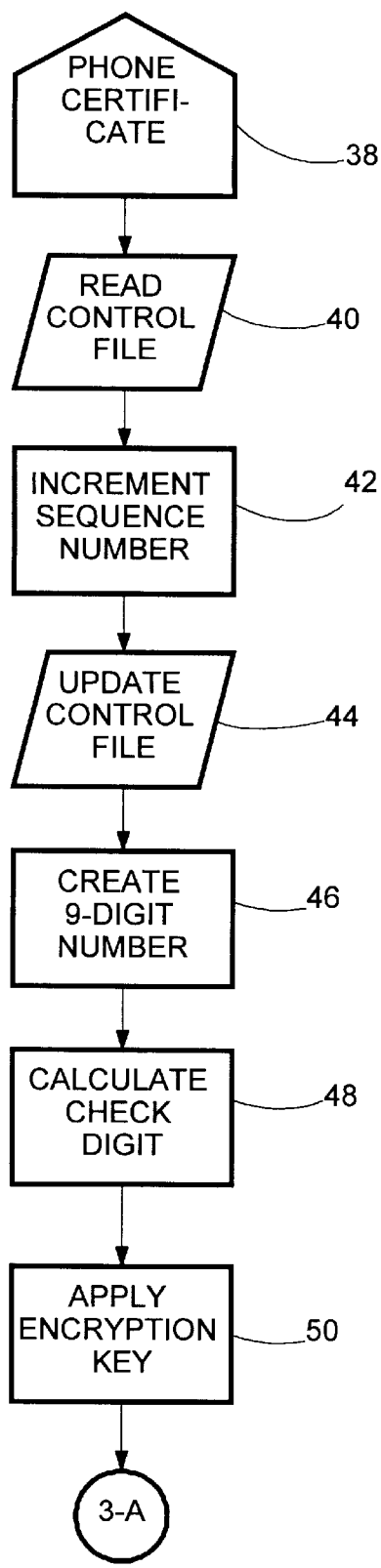
FIG. 3 shows a flowchart for the creation of an encrypted pin number for a certificate.
Figure 4:
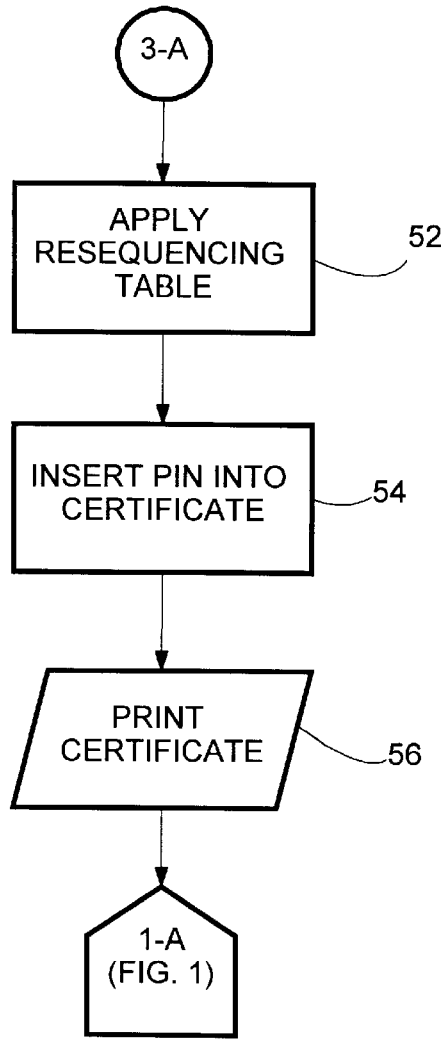
FIG. 4 shows a flowchart for the insertion into the printing instructions of the encrypted pin number onto the certificate.

If the system determines that the award program identified requires a system generated authorization code, the system will search for a data encryption file. If a data encryption file does not exist, the system will print a message at the point-of-sale to indicate that the award is not currently available and to indicate some other means for obtaining the award that was earned. If a data encryption file exists, the system will use this file to generate in real time, as indicated in FIG. 3, a ten-digit authorization code to be printed on the award certificate. This process begins, as indicated at 38, and first requires reading of a control file (40) that contains various parameters used in the generation of the certificate.

A certificate sequence number obtained from the control file is incremented, as indicated in block 42, and the control file is updated, as indicated in block 44. Then a "1st level authorization code" is generated, as indicated in blocks 46 and 48. This code includes a 5-digit location number, a 4-digit PIN number, and a check digit. The location number represents the number of the store at which the award or certificate is being distributed. This number will remain the same for that store throughout an award program. The PIN number will change incrementally each time an award certificate with a computer generated authorization code is printed. The check digit can be computed in a variety of ways, such as by adding all the other digits together and then ignoring all but the last digit of the result. This 1st level authorization code is then encrypted with the use of a ten-digit "key" code, as indicated in block 50. Each award program run will have a different key code associated with it. The mathematical function performed using the key code can vary. For example, each digit of the key code may be added to the respective digit of the 1st level authorization code without a carry, to arrive at a "2nd level authorization code". To accomplish adding without a carry, if the sum of two digits results in a number greater than 9, the first digit of the result will be ignored.

For example, if the PIN number at store 1 was to start at 1, the 1st level authorization code would be: 0000100012.

If the key code established for the award program were 1234559884, the 2nd level authorization code would be: 1234659896.

The 2nd level authorization code is then rearranged using a pre-established rearrangement scheme, as indicated in block 52. A rearrangement scheme is a ten digit sequence which indicates a new ordering for each digit of the 2nd level authorization code. The rearrangement schemes are grouped into tables of ten schemes each. Each scheme of one table would have the same last digit. This last digit of the scheme indicates in which digit position of the final authorization code the table's scheme number will be placed. Each award program will have a specific rearrangement scheme table associated with it. For example, assume the following table exists to rearrange the 2nd level authorization code obtained above:

Rearrangement Scheme Table

Scheme number: Original Position 0123456789

| | |
|---|---|
| 0 | 7354982160 |
| 1 | 1598234670 |
| 2 | 8412756390 |
| 3 | 5941368270 |
| 4 | 3794861520 |
| 5 | 1539274860 |
| 6 | 2685149730 |
| 7 | 9317482560 |
| 8 | 6428915730 |
| 9 | 4196283750 |

Because the 2nd level authorization code ends with a 6, the system will use rearrangement scheme number 6 or: 2,6,8,5,1,4,9,7,3,0.

Each digit in the above sequence indicates the new position of the digit in the corresponding position of the 2nd level authorization code. Therefore, the 2nd level authorization will be transformed into the final authorization code of: 9542839.

This number will then be inserted into the certificate and printed, as indicated in blocks 54 and 56, together with instructions to use it as authorization in redeeming the award earned.

When the award certificate is presented for redemption, the awarding party will have to verify that the certificate being presented is a valid one. This will be done in one of two ways. First, if the award program was run using pre-established authorization codes, the award provider will simply review its list of authorization codes to determine if the one currently presented is valid. If it is valid, the award will be given and the authorization code will be stricken from the award provider's list.

Figure 5:
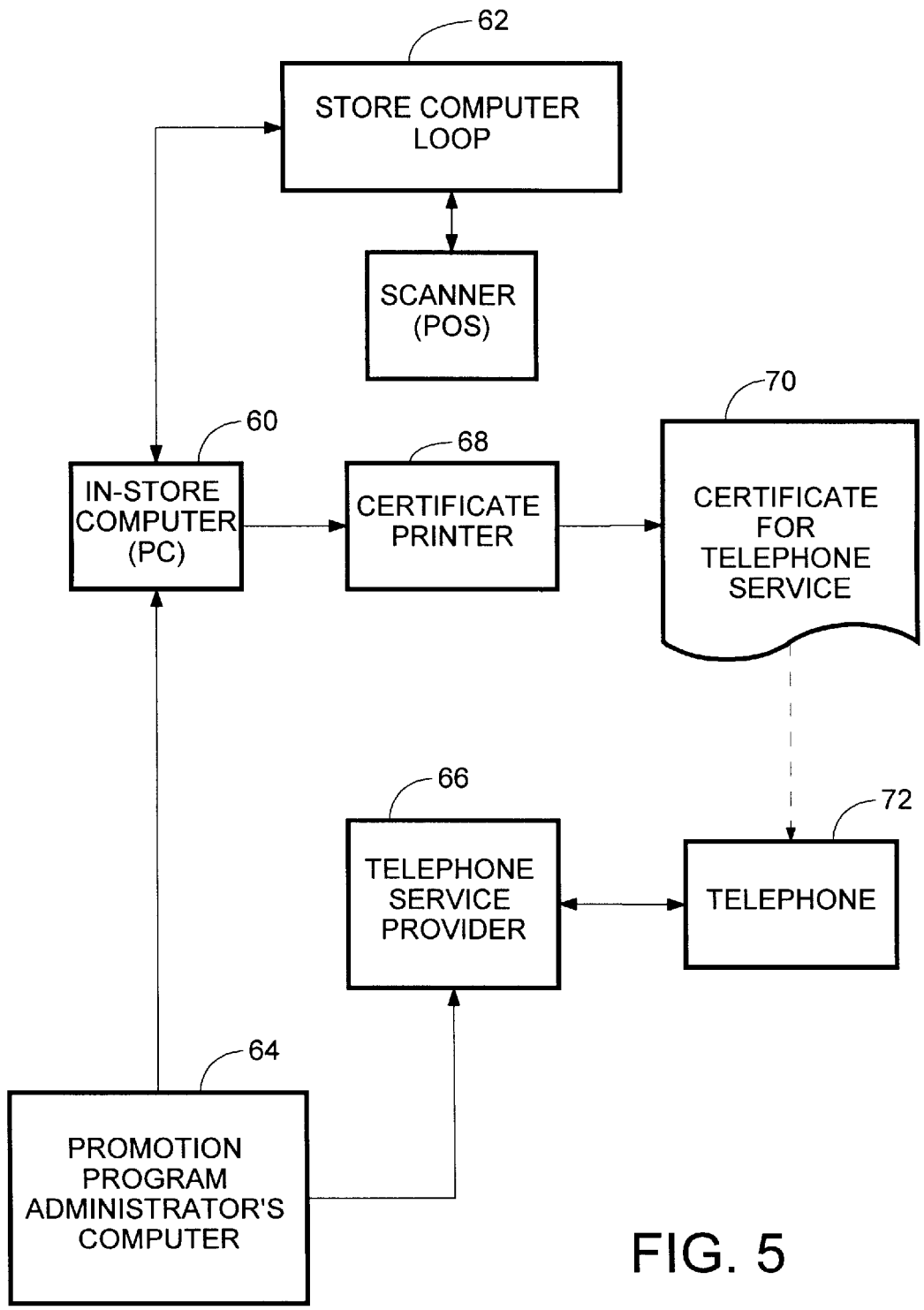
FIG. 5 is a block diagram of a system in accordance with the present invention.

If the award program was run with system generated authorization codes, the award provider would perform the reverse of the procedures performed by the system in encrypting the authorization code for print. In order for this party to perform the decryption procedures, they will have to be provided with the rearrangement scheme table and key code associated with the program as well as valid location numbers, PIN numbers, and the check digit methodology. In our example, the award provider would receive the authorization code 6619542839. Because this code has a 6 in the 0 position, the provider will look to the rearrangement scheme in the sixth position in the rearrangement table they were given. This rearrangement scheme will be used to reorder the authorization code back to 1234659896. Then the key code will be subtracted out (without borrowing from digits) to arrive at the original authorization code of 0000100012. This code can then be verified by confirming that the check digit methodology agrees with the one which was pre-established, the location number is a valid one, and the PIN number is valid based on the pre-established starting number and increment amount. It can also be confirmed in the provider's database that this authorization code has not already been used for this program Setting Up a Long Distance Calling Promotion Program:

Promotion or sales programs using the principles of the present invention may be implemented in a variety of ways. Preferably, and most conveniently, the invention can be implemented using equipment already installed in retail store for other purposes. As shown in FIG. 5, a typical retail store already includes a coupon or certificate printer located at each checkout terminal, and a scanner at each checkout terminal, to record which items are purchased by each customer. The store also has, in addition to its conventional computer (not shown), an in-store computer 60 used exclusively for monitoring purchases and generating coupons and the like. This in-store PC 60 is coupled to a store computer loop 62 that connects all the checkout terminals to the store's main computer, and is also connected by an appropriate communication link to a promotion program administrator's computer 64, which is located at some central site, remote from the stores.

The administrator's computer 64 may be used for setting up various promotions, such as for the generation of discount coupons to be triggered by the purchase of selected items. In the context of the present invention, the administrator's computer 64 is set up to contain the following files:

(1) a file containing in each record the number of PINs to distribute to each store in the program, defined by store number and chain number, (2) a file containing in each record textual information similar to that in the first file, for transmission to the telephone service provider 66.

(3) a text file that is downloaded to each store computer 60 and contains the toll-free "800" number information and PIN information, such as a starting number to use, as discussed above for PIN generation. In an alternative embodiment of the invention, encrypted PINs may be generated in the administrator's computer 64 and downloaded to the stores, rather than generated in the individual stores.

Associated with the in-store computer 60 is a certificate printer 68, which prints telephone service certificates, as indicated at 70. The consumer (not shown) dials the toll-free 800 number printed on the certificate 70, using a telephone 72, which is connected to the telephone service provider 66.

Set-up of a program also requires the specification of certain elements of the certificate layout, such as where the "800" number will be printed and where the encrypted PIN will be printed. This aspect of the implementation is no different from similar aspects of implementation of other coupon programs. For purchased certificates, instructions may be printed in any of a number of languages, as selected at the time of purchase.

If the telephone service certificate cannot be printed for some reason (e.g., PIN numbers exhausted, wrong PIN file, or damaged PIN file), an alternate certificate can be set up for printing. The philosophy in this regard is to provide the customer with a mail-in certificate in the event that an actual phone certificate cannot be issued, even though the customer has complied with the requirements of the certificate offer.

PIN Generation:

This section describes the process through which PINs will be generated in such a way that a telephone service provider will be able to validate the PINs without knowing in advance what those PINs actually are.

Overview of PIN Generation:

PINs will initially be generated in the format as follows:

lllllnnnnc where:

| | |
|---|---|
| lllll | is a preassigned five-digit location number, |
| nnnn | is a four-digit PIN, and |
| c | is a check digit (modulo 10). |

The location number lllll will remain constant throughout a promotion program. The PIN number nnnn will increment every time a certificate is issued. The check digit is calculated by adding all of the odd digits (starting from the right). The even digits are doubled individually, and if the result of a doubled digit is greater than 10, the digits of the resulting number is summed. For example, 8 would double to 16, then the digits 1 and 6 would be added together, yielding 7. The sum of all of the doubled even digits is then added to the sum of all of the odd digits. The result (modulo 10) is the check digit.

Once this composite PIN has been created, a ten digit "key" field will be added to the 10 digit PIN number without carry, that is, each digit in the key is added to the respective digit in the PIN. If there is a carry (the result is greater than 9), the carry is ignored. After the key is added, the PIN is rearranged by picking one of ten rearrangement sequences based on the last number of the PIN. The rearrangement table must be created in such a way that the last digit (the one that started out as the check digit) is always placed in the same position so that validation can take place at the telephone service provider's site.

The validation process merely reverses this process. The telephone service provider will be provided with a list of valid store location numbers and key information for each program to use in the validation process. The sequence table will not need to change with each program.

Example:

If the PIN number at location 1 was to start at 1, the actual pin number would be: 0000100012, where 00001 is the location, 0001 is the PIN number and 2 is the check digit.

Assume for the example that the "key" is 0123456789. The converted PIN would then be: 0123556791

The lookup into the sequence table would be subscript 1 (the resulting, converted check digit). If the sequence at location 1 were to be 0987654321, the actual PIN printed would be:

0197655321

In order for this process to work, all of the sequence numbers would have to end in 1. This assures that the validation process can be worked backwards.

Validation:

When the printed PIN is entered via a telephone key pad, the telephone service provider must perform the following calculations in order to assure that this is a valid PIN.

Find the sequence: Since the sequence key is in an agreed upon location (position 1 in the example) the provider must get sequence 1 from the table and apply it to the PIN.

PIN 0197655321

SEQ # 0987654321

PIN 0123556791

Remove the key: Next, the key must be removed from the PIN. (Subtraction needs to be done without borrowing from the other digits.)

PIN 0123556791

KEY 0123456789

PIN 0000100012

At this point, the check digit should be checked to validate the PIN. If the check digit passes, further validation should take place, e.g., to verify that the location number (00001) a valid location.

More security can be added by selecting a valid range for the four-digit PIN number. One might start at 100, for example, and increment by 3. To validate the number in this case, two additional criteria must be met: the number must be greater than 100, and the number minus 100 must be divisible by 3.

Files:

One file will reside on the store computer for each telephone calling program currently running. For example, the file name will be of the form:

Tmmmmmm.???

The file will contain the following:

ssss, ccc, lllll, nnnn,ii,10*[rrrrrrrrrr], kkkkkkkkkk, nnnnnnnnnn where:

| | |
|---|---|
| ssss | is the store number. |
| ccc | is the chain number. |
| lllll | is the five-digit location number. |
| nnnn | is a starting number. |
| ii | is a value to increment the starting number by. |
| rrrrrrrrrr | is a relocation table (used to scramble the numbers). |
| kkkkkkkkkk | is the decryption/encryption key. |
| nnnnnnnnnn | is the program 800 number. |

More specifically, the file name may be Tmmmmmmm.CMC. The file will be a transmitted from the program administrator's computer to the telephone service provider. It will be generated during the creation of the individual files for the store computer. The file will contain one entry (record) for each store running a particular phone program. Each record will look as follows:

lllll,ccc,nnnn,ii,kkkkkkkkkk where:

| | |
|---|---|
| lllll | is the five-digit location number. |
| ccc | is the chain number. This must be cross-referenced to the five-digit location number so that when a PIN is redeemed, the proper recording is played to the consumer. |
| nnnn | is the starting PIN number. |
| ii | is the value each PIN will be incremented by. |
| kkkkkkkkkk | is the decryption key used in this program. |

Conclusion:

(a) A summary of the process using the example of awards of long distance telephone service follows:

A manufacturer of (Brand A) baby food wishes to provide five minutes of long distance telephone service to each consumer that purchases more than three jars of a competitor's (Brand B) baby food. A consumer enters a retail establishment (location 00001) and purchases a cart full of groceries which includes five jars of Brand B baby food. The point-of-sale monitoring system described in U.S. Pat. No. 4,723,212 to Mindrum et. al. identifies the first jar of Brand B baby food as being related to an award program that is currently in process at this location. It further identifies that the program is a telephone service award and requires the purchase of four or more jars of Brand B baby food. The monitoring system logs this purchase and the additional purchases of Brand B baby food until the requirements of the award program have been met. If the requirements were not met, the purchases would be ignored and a certificate would not print for this award program. If the requirements have been met, the system initiates an award process which delivers the wishes of the Brand A manufacturer. It retrieves the structure which is required on the resulting award certificate and completes fields which require unique input from the system. For this program, the unique information required includes a 1-800 telephone number to call to activate the award and the authorization number needed for proof of validity. The system retrieves the proper 1-800 telephone number for this award and location and determines that (in this example) the authorization code must be generated by the system. The system identifies the award currently earned as the first award at this location and therefore assigns the 1st level authorization code: 0000100012 discussed above. Using the key code and rearrangement table discussed above, the system arrives at the final authorization code 6619542839 and inserts this code in the proper field of the award design. The Mindrum system then causes the printer at the point-of-sale to print the award certificate so it can be handed to the consumer with her receipt tape when checkout is complete. The consumer receives a certificate which may contain the following text:

"Congratulations!

You've just been awarded five minutes of free long distance telephone service

Compliments of Brand A baby food

To activate your free service simply dial: 1 (800) 123-4567

Enter authorization code: 6619542839 when prompted."

The consumer can then immediately gain access to a telephone, dial the 800 number, respond to any pre-recorded advertising messages activated by this number and then enter the authorization code. Once the authorization code is entered, the telephone service provider's system can perform the decryption procedures outlined above to verify that the award is valid and has not already been used. Once this procedure is performed, which would take a matter of seconds, the free service is activated and the certificate is discarded by the consumer.

The consumer has received the same benefit as she would have received if the award program were run using the traditional credit or debit card methods. However, there is no lag time between earning the award and receiving the benefit. The costs associated with manufacturing and delivering plastic cards are avoided, as well as the security concerns related to the handling of such cards. There are no shortages or excess inventories and, if the real-time generation of authorization codes is used, there is no need to wait for codes from the service provider prior to delivering certificates.

(b) In an alternative implementation of the invention, value certificates, such as for telephone long-distance service, are generated in response to requests to purchase such certificates. The method and apparatus for generating a PIN for the certificate are the same as described for the award generation example. The principal difference is the manner in which the certificate generation is triggered. For the award, one or more purchasing events are detected and used to trigger the generation of the certificate. For the purchased certificate, the triggering event is the consumer's request to purchase a certificate of a selected value or telephone time. Another difference is that the award certificate cannot normally be extended in time or value, but the purchased certificate can be "recharged" by adding more value, such as through use of a credit card. Other differences pertain to the manner in which the certificate redemption stage is implemented. Promotional messages directed to the consumer are typically supplied by the certificate retailer, in contrast to the manufacturer messages usually directed to the consumer who wins a promotional award. In most important respects, however, the two types of certificates are generated in exactly the same way and have similar advantages.

The most important advantages of the invention arise from its generation of an authorization code or PIN immediately prior to distribution of a certificate. Security problems arising from preprinting PINs on certificates or cards, or from maintaining an inventory of PINs, are completely eliminated. Moreover, no time is wasted in having to activate certificates at the time of distribution, because each certificate is printed with a newly generated, unique, active PIN or authorization code. A related advantage is that access numbers and other user information can be easily updated as the need arises, because the information is not preprinted on the certificates. Another advantage is that the PIN, when decrypted, contains the identify of the location where the certificate is printed and distributed. This information can be used to provide an audit trail, for accurate tracking of certificate usage, and to aid the detection of any fraudulent use of the certificate.

It will be appreciated that the invention also has application to other types of promotions and sales activities, and is not limited to the distribution of telephone calling time certificates. More generally, the invention is applicable to any situation in which it is desired to distribute valuable credit or services in a secure manner, such that the credit or services can only be claimed or redeemed by means of a personal identification code. Importantly, the invention provides a way of encrypting personal identification codes in real time at the point of their generation, thereby effectively precluding the possibility that the codes may be lost or stolen between their point of generation and their point of use. Moreover, the invention avoids the need for creation and maintenance of a database of valid personal identification codes.

What is claimed is:

1. A method for generation of a certificate, in a retail store, the certificate providing valuable credit or services, the method comprising the steps of:

detecting the occurrence of an event at a point of sale in a retail store, the event having been preselected as an event to trigger the generation of a certificate of value for distribution to a customer of the retail store;

generating for a consumer in the retail store a certificate of value in response to the foregoing detecting step;

generating a unique authorization code at the same time that the certificate is generated; and including the authorization code in the certificate, wherein the authorization code must be presented by the consumer to validate the certificate, and wherein the certificate is self-validating and has no existence or value prior to its generation, and no value until the authorization code is validated, and whereby there is no requirement to keep an inventory of either certificates or authorization codes prior to their distribution.

2. A method as defined in claim 1, wherein:

the step of generating a unique authorization code includes forming a unique code and encrypting it to obtain the unique authorization code.

3. A method as defined in claim 2, wherein:

the step of forming a unique code includes combining a unique sequence number with other codes.

4. A method as defined in claim 3, wherein the step of encrypting includes:

combining the unique code with a key code; and positionally rearranging the code obtained from the combining step, to obtain the unique and seemingly random authorization code.

5. A method as defined in claim 2, and further comprising the step of:

validating the authorization code when the certificate is presented to claim its value, wherein the validating step includes decrypting the authorization code to recover the unique code, and then verifying that the unique code is valid.

6. A method as defined in claim 1, and further comprising the step of:

using the authorization code on the certificate to obtain a valuable service.

7. A method as defined in claim 1, wherein:

the step of detecting the occurrence of an event includes detecting the purchase of at least one triggering product in the retail store; and the certificate is in the nature of a reward for purchasing the triggering product.

8. A method as defined in claim 1, wherein:

the step of detecting the occurrence of an event includes detecting a request to purchase a selected certificate of value in the retail store.

9. Apparatus for generating a certificate providing valuable credit or services to a customer of a retail store, the apparatus comprising:

an in-store computer to detect the occurrence of an event that has been preselected to trigger the generation of a certificate of value for distribution to a customer;

a certificate generator for generating a certificate in response to the detection of a triggering event; and an authorization code generator, for generating a unique authorization code at the same time that the certificate is generated;

wherein the authorization code is included in the generated certificate, for use by the customer in deriving something of value from the certificate, which becomes self-validating on generation, but has no value until the authorization code is verified, and whereby there is no requirement to keep an inventory of either certificates or authorization codes prior to their distribution.

10. Apparatus as defined in claim 9, wherein the authorization code generator includes:

encryption logic, for encrypting a unique code to obtain the unique authorization code.

11. Apparatus as defined in claim 10, wherein the encryption logic includes:

a code combiner, for combining the unique code with a key code to obtain a first-level encrypted code; and code sequence rearrangement logic, for changing the sequence of digits in the first-level encrypted code, to obtain the unique authorization code.

12. Apparatus as defined in claim 10, and further comprising:

validation logic, for decrypting the authorization code to recover the unique code, and then verifying that the unique code is valid.

13. Apparatus as defined in claim 9, wherein:

the certificate generator operates in response to the purchase of a preselected triggering product, and generates a reward certificate.

14. Apparatus as defined in claim 9 wherein:

the certificate generator operates in response to a request to purchase a certificate of value.

15. A method for generation of a token evidencing prepayment for a service, for distribution to a consumer in a retail store, the method comprising the steps of:

detecting the occurrence of an event that has been preselected to trigger generation of a token of prepayment for distribution to a consumer; and generating the token of prepayment token in response to the foregoing detecting step, wherein the step of generating the token of prepayment includes generating a unique authorization code for inclusion as part of the token;

wherein the token is self-validating and has no existence or value prior to its generation, and no value prior to verification of the authorization code when the token is used, and whereby there is no need to maintain an inventory of tokens or authorization codes.

* * * * *